(12) United States Patent
Krichen et al.

(10) Patent No.: US 11,188,749 B2
(45) Date of Patent: Nov. 30, 2021

(54) METHOD FOR BIOMETRIC RECOGNITION FROM IRISES

(71) Applicant: IDEMIA IDENTITY & SECURITY FRANCE, Courbevoie (FR)

(72) Inventors: Emine Krichen, Courbevoie (FR); Jean Beaudet, Courbevoie (FR); Elise Le Gouil, Courbevoie (FR)

(73) Assignee: IDEMTA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 16/407,697

(22) Filed: May 9, 2019

(65) Prior Publication Data

US 2019/0347483 A1 Nov. 14, 2019

(30) Foreign Application Priority Data

May 9, 2018 (FR) ...................... 18 53975

(51) Int. Cl.
*G06K 9/00* (2006.01)

(52) U.S. Cl.
CPC ....... *G06K 9/00617* (2013.01); *G06K 9/0061* (2013.01); *G06K 9/00604* (2013.01)

(58) Field of Classification Search
CPC ............. G06K 9/00604; G06K 9/0061; G06K 9/00617; G06K 9/00899; G06K 9/4671; G06K 9/00906; G06K 9/00; G06K 9/00597; G06K 9/00892; G06F 21/32; G06F 16/5854; G06F 3/013; G02B 2027/0138; G02B 2027/014; G02B 2027/0187; G02B 27/0093; G02B 27/017; G06Q 50/265; G06T 2207/30196; G06T 7/60; G07C 1/10; H04L 67/12

See application file for complete search history.

(56) References Cited

U.S. PATENT DOCUMENTS

| | | | |
|---|---|---|---|
| 8,594,374 B1 * | 11/2013 | Bozarth | G06K 9/00604 382/103 |
| 2006/0147094 A1 * | 7/2006 | Yoo | G06K 9/0061 382/117 |
| 2016/0117544 A1 * | 4/2016 | Hoyos | G06K 9/00604 348/78 |
| 2017/0103276 A1 * | 4/2017 | Rauhala | G06K 9/00604 |
| 2017/0109580 A1 * | 4/2017 | Kaehler | G02B 27/017 |
| 2018/0005009 A1 | 1/2018 | Rouh et al. | |

OTHER PUBLICATIONS

Hughes et al., Detection of Contact-Lens-Based Iris Biometric Spoofs Usnig Stereo Imaging, 46th Hawaii International Conference on System Sciences, 2013, pp. 1763-1772, IEEE Computer Society, 10 pages.

* cited by examiner

*Primary Examiner* — Michael J Vanchy, Jr.
(74) *Attorney, Agent, or Firm* — Muncy, Geissler, Olds and Lowe, P.C.

(57) ABSTRACT

A method for verifying the authenticity of the iris of an eye of a biometric recognition candidate, comprising the step of verifying the flatness of the iris from two images of the iris in different orientations with respect to the image sensor. Optical recognition method and device implementing said method.

9 Claims, 1 Drawing Sheet

METHOD FOR BIOMETRIC RECOGNITION FROM IRISES

The present invention relates to the field of biometrics and more particularly biometric recognition from irises.

STATE OF THE ART

There are biometric recognition methods including the steps of:
- capturing an image of an individual's iris;
- extracting biometric characteristics from the image;
- comparing the extracted biometric characteristics with stored biometric characteristics to determine a similarity score;
- validating the recognition if the similarity score is higher than a predetermined threshold.

The stored biometric characteristics can be stored:
- in a personal data carrier carried by the user, such as an integrated circuit card, a passport or another item; or
- in a database linking biometric characteristics and identification data of authorised individuals, access rights to a computer system or another system.

The stored biometric characteristics were extracted and recorded during a prior step of enrollment of the individual.

It is now common for people to wear decorative or cosmetic lenses that at least partially mask the iris to change its appearance. The use of such cosmetic lenses may distort the biometric recognition, particularly if the candidate for recognition wears lenses the pattern of which is a reproduction of the appearance of the irises of an individual other than the candidate for recognition.

PURPOSE OF THE INVENTION

One aim of the invention is to supply means for improving the reliability of the methods for the biometric recognition from irises.

BRIEF SUMMARY OF THE INVENTION

To this end, a method is provided, according to the invention, for verifying the authenticity of the iris of an eye of a biometric recognition candidate from an iris image, including the steps of:
- capturing, by means of at least one optical sensor, a first image and a second image of the candidate's eye in a first and a second relative orientation of the eye with respect to the image sensor respectively;
- detecting homologous characteristic points in the first image and in the second image;
- checking that the homologous characteristic points of the first image correspond to the homologous characteristic points of the second image after applying a homography to the homologous characteristic points of the second image;
- considering the iris to be authentic when the verification is positive.

The method of the invention makes it possible to verify that the iris represented on two images with different orientations is real and is therefore not a reproduction of an iris affixed to a decorative lens. The iris of an eye is flat so that the shape of a pattern formed by homologous characteristic points in the first image will be identical to the shape of the pattern formed by the same homologous characteristic points in the second image, with one homography. The cosmetic lens covers a portion of the eye surface so that the homologous characteristic points are positioned not on a plane but on a surface substantially in a spherical cap. A pattern formed by homologous points in the first image, for example a straight line, will not have the same shape in the second image, the pattern will have the shape of a curved line. There is therefore no planar projection enabling to switch from the first pattern to the second pattern.

Preferably, the verification is considered as positive when the homologous characteristic points of the first image correspond to the homologous characteristic points of the second image after applying a planar projection to the homologous characteristic points of the second image and with a residual deviation below a predetermined threshold.

This reduces the risk of false rejection.

Advantageously, the predetermined threshold is defined by taking into account a deformation induced by the lens depending on the orientation of the eye.

The invention also relates to a biometric recognition method and device implementing this cosmetic lens detection method.

Other characteristics and advantages of the invention will become apparent upon reading the following description of particular non-restrictive embodiments of the invention.

BRIEF DESCRIPTION OF THE FIGURES

Reference is made to the appended drawings, wherein.

DETAILED DESCRIPTION OF THE INVENTION

Figure 1:
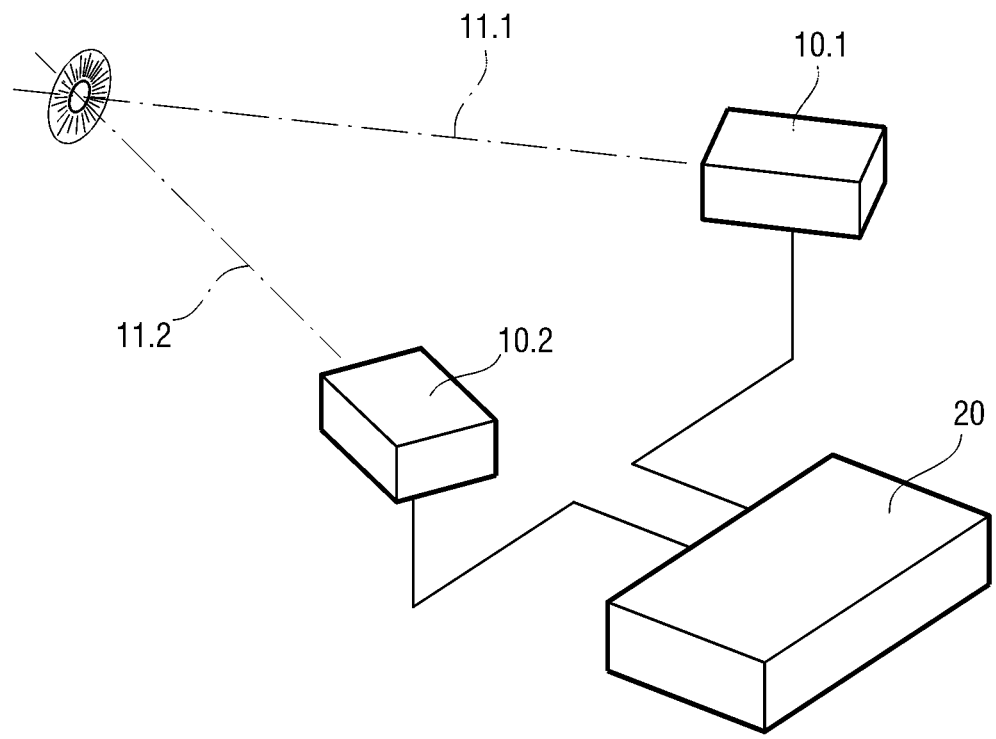
FIG. 1 is a schematic view of a biometric recognition device according to the invention.
Figure 2:
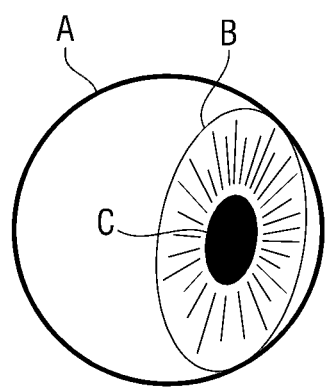
FIG. 2 is a schematic view of an eye without any cosmetic lens.

With reference to the figures, the invention is described here in application to the biometric recognition of individuals from an iris B of one of their eyes A (FIG. 2).

The invention relates to a biometric recognition device, comprising two optical sensors 10.1, 10.2 which are oriented relative to each other so as to cover the same capture area, here represented by an iris, and have secant lines of sight 11.1, 11.2 in said capture area. The optical sensors 10.1, 10.2 are here CCD sensors or photodiode or phototransistor sensors.

The optical sensors 10.1, 10.2 are connected to an electronic control unit 20 which includes a processor and a memory containing in particular a program with instructions for controlling the optical sensors 10.1, 10.2 and implementing the recognition method according to the invention.

The method for the biometric recognition of a candidate includes the following steps:
- checking the authenticity of the iris on one eye of the candidate;
- extracting biometric characteristics from at least one image of the candidate's iris;
- comparing the extracted biometric characteristics with stored biometric characteristics to determine a similarity score;
- validating the recognition if the similarity score is higher than a predetermined threshold.

Figure 3:
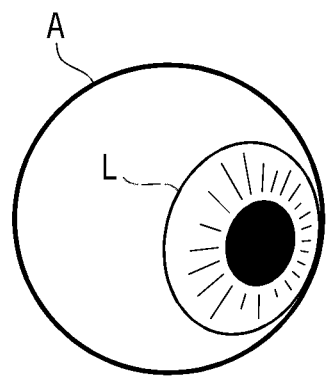
FIG. 3 is a schematic view of an eye with a cosmetic lens.

The authenticity check is intended to ensure that the iris is a real iris and not an iris reproduced on a decorative lens L (FIG. 3). FIGS. 2 and 3 show that an authentic iris B is flat (FIG. 2) while a decorative lens L is shaped like a spherical cap (FIG. 3).

The method for verifying the authenticity of the iris comprises the following steps:

- capturing, by means of the two optical sensors 10.1, 10.2, a first image and a second image of the candidate's eye according to a first and a second relative orientation of the eye with respect to the image sensor respectively;
- detecting homologous characteristic points in the first image and in the second image;
- checking that the homologous characteristic points of the first image correspond to the homologous characteristic points of the second image after applying a homography to the homologous characteristic points of the second image;
- considering the iris to be authentic when the verification is positive.

The homologous characteristic points are points, in the geometric sense of the term, which are located in particular on the periphery of characteristic iris patterns and which are visible on both images. The patterns are heterogeneities of appearance that can take the form of spots, lines or other forms. The detection of characteristic points is carried out by the electronic control unit 20 which implements a detection algorithm known per se. This detection algorithm is for example of the SIFT (Scale Invariant Feature Transform) type.

The verification operation consists in verifying that the figure formed by the homologous characteristic points of the first image (the first original figure) can be obtained by applying a homography to the figure formed by the homologous characteristic points of the second image (the second original figure). The determination of a homography making it possible to align two sets of homologous points is known to the skilled person (cf. for example: Torr, P. H., and Zisserman, A., Feature based methods for structure and motion estimation, *International workshop on vision algorithms* (pp. 278-294), September 1999, Springer, Berlin, Heidelberg). Thus, for example, several homographies will be tried. The application of each homography to the second original figure will give a second result figure. Each second result figure will be compared to the first original figure and, if the two figures are not perfectly identical, a residual deviation is determined. The verification is considered as positive when the residual deviation is less than a predetermined threshold. The predetermined threshold is defined by taking into account a deformation induced by the lens depending on the orientation of the eye. It is known that the crystalline lens with a curved outer surface can induce a slight deformation of the visual appearance of the iris.

To improve the accuracy of the threshold determination, the angle between the two viewing directions 11.1, 11.2 is taken into account. This angle can be stored as it is or is determined from the position of the optical sensors 10.1, 10.2 by triangulation.

It should be noted that, in some cases, it may be advantageous to compensate for image distortions (radial, tangential distortions, etc.) beforehand.

Alternatively, it is possible to use a biometric matching algorithm to determine homologous points (as an alternative to the SIFT method).

Of course, the invention is not limited to the described embodiments but encompasses any alternative solution within the scope of the invention as defined in the claims.

In particular, the image capture can be performed using a single optical sensor, asking the candidate to move his/her eye between the two image captures. For this purpose, the candidate can be asked, for example, to look in a first direction for the capture of the first image and then in a second direction for the capture of the second image. These two directions can be "materialized" by displaying on a screen, successively and in two areas of the screen separated from each other, a symbol that the candidate must stare at.

Alternatively, the authenticity verification method may include a step of transforming each image into a polar coordinate representation before searching for homologous points.

The biometric characteristics used for biometric recognition can be extracted from the first image, and/or the second image and/or a third image captured specifically for this purpose. Images can be captured in the same wavelength range or in different ranges.

The invention claimed is:

1. A method for verifying the authenticity of the iris of an eye of a biometric recognition candidate from an iris image, comprising the steps of:
   - capturing, by means of at least one optical sensor, a first image and a second image of the candidate's eye in a first and a second relative orientation of the eye with respect to the image sensor respectively;
   - detecting homologous characteristic points in the first image and in the second image;
   - determining a residual deviation between the homologous characteristic points of the first image and the homologous characteristic points of the second image after applying a homography to the homologous characteristic points of the second image, the homography applied to the homologous characteristic points of the second image being a planar projection;
   - considering the iris to be authentic when the residual deviation is less than a predetermined threshold, the predetermined threshold being defined by taking into account a deformation induced by a crystalline lens of the candidate's eye according to the orientation of the eye.

2. The method according to claim 1, comprising a step of transforming each image into a polar coordinate representation before searching for homologous points.

3. The method according to claim 1, wherein the image capture is performed by asking the candidate to move his/her eye between the two image captures.

4. The method according to claim 1, wherein the image capture is performed using two optical sensors having secant lines of sight substantially in a common capture area of the optical sensors.

5. A biometric recognition method, comprising the following steps:
   - verifying the authenticity of the iris on one eye of the candidate by implementing the method according to claim 1 and, if the residual deviation is less than a predetermined threshold;
   - extracting biometric characteristics from at least one image of the candidate's iris;
   - comparing the extracted biometric characteristics with stored biometric characteristics to determine a similarity score;
   - validating the recognition if the similarity score is higher than a predetermined threshold.

6. The method according to claim 5, wherein the image from which the biometric characteristics are extracted is the first image or the second image.

7. The method according to claim 5, wherein the image from which the biometric characteristics are extracted is a third image.

8. A biometric recognition device, comprising at least one optical sensor connected to an electronic control unit arranged to control the optical sensor in order to implement the recognition method according to claim 5.

9. The device according to claim 8, comprising two optical sensors oriented relative to each other so as to cover the same capture area and have secant lines of sight in said capture area.

\* \* \* \* \*